United States Patent
Suryanarayanarao et al.

(10) Patent No.: US 11,223,705 B2
(45) Date of Patent: Jan. 11, 2022

(54) TECHNIQUES TO DYNAMICALLY NEGOTIATE AND PROVIDE COMPRESSION FOR PACKET FORWARDING CONTROL PROTOCOL (PFCP) MESSAGES

(71) Applicant: Cisco Technology, Inc., San Jose, CA (US)

(72) Inventors: Raghavendra Vidyashankar Suryanarayanarao, Bangalore South (IN); Tomonobu Okada, Tokyo (JP); Pravin Appaji Ajagekar, Maharashtra (IN); Aeneas Sean Dodd-Noble, Andover, MA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/810,994

(22) Filed: Mar. 6, 2020

(65) Prior Publication Data
US 2021/0281664 A1    Sep. 9, 2021

(51) Int. Cl.
H04L 29/06    (2006.01)
H04W 28/06    (2009.01)

(52) U.S. Cl.
CPC ............ *H04L 69/04* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 2015/0085876 A1* | 3/2015 | Chhatriwala | H04L 69/04 370/465 |
| 2016/0142518 A1* | 5/2016 | Raina | H04L 69/04 370/230 |
| 2016/0309363 A1* | 10/2016 | Persson | H04L 69/22 |
| 2017/0163694 A1* | 6/2017 | Skuratovich | H04L 69/161 |
| 2020/0059992 A1* | 2/2020 | Skog | H04W 80/10 |
| 2020/0267077 A1* | 8/2020 | Williams | H04L 45/302 |

OTHER PUBLICATIONS

3GPP, "3rd Generation Partnership Project; Technical Specification Group Services and System Aspects; Procedures tor the 5G System (5GS); Stage 2 (Release 16)", 3GPP TS 23.502 V16.3.0, Dec. 2019, 558 pages.

(Continued)

*Primary Examiner* — Diane L Lo
(74) *Attorney, Agent, or Firm* — Edell, Shapiro & Finnan, LLC

(57) ABSTRACT

Presented herein are techniques to facilitate dynamic negotiation and compression of Packet Forwarding Control Protocol (PFCP) messages in a mobile networking environment. In one example, a method includes identifying, by a function, a negotiated compression algorithm to utilize for compressing one or more Packet Forwarding Control Protocol (PFCP) messages; determining whether a payload for a particular PFCP message is to be compressed based on at least one of system resources of the function and a size of the payload; based on determining that the payload is to be compressed, compressing the payload utilizing the negotiated compression algorithm to generate a compressed PFCP message; and setting a compression indication in a header of the compressed PFCP message.

20 Claims, 14 Drawing Sheets

(56) References Cited

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, 417 pages.
G. Camarillo, "Compressing the Session Initiation Protocol (SIP)", Network Working Group, Request for Comments 3486, Category: Standards Track, Feb. 2003, 12 pages.
Wikipedia, "PFCP", https://en.wikipedia.org/wiki/PFCP, Nov. 29, 2019, 5 pages.
Cisco, "Cisco Bug: CSCvo35511-[BP-CUPS] mon pro PFD compression flag needs to be enabled for respective IEs",https://quickview.cloudapps.cisco.com/quickview/bug/CSCvo35511, Nov. 7, 2019, 1 page.
Cisco, "Cisco Bug: CSCvn80152-[BP-CUPS] Observing new IE Interface: SXa wrongly sent in PFCP Heartbeat Request/Response", https://quickview.cloudapps.cisco.com/quickview/bug/CSCvn80152, May 9, 2019, 2 pages.
3GPP, "3rd Generation Partnership Project; Technical Specification Group Core Network and Terminals; Interface between the Control Plane and the User Plane Nodes; Stage 3 (Release 16)", 3GPP TS 29.244 V16.2.0, Dec. 2019, 281 pages.
3GPP, "3rd Generation Partnership Project; Technical Specification Group Services and System Aspects; Policy and charging control framework for the 5G System (5GS); Stage 2 (Release 16)", 3GPP TS 23.503 V16.3.0, Dec. 2019, 112 pages.

\* cited by examiner

ENHANCED CP FUNCTION FEATURES IE
200

| Octets | Bits | | | | | | | |
|---|---|---|---|---|---|---|---|---|
| | 8 | 7 | 6 | 5 | 4 | 3 | 2 | 1 |
| 1 to 2 | Type = 89 (decimal) | | | | | | | |
| 3 to 4 | Length = n | | | | | | | |
| 5 | Supported-Features | | | | | | | |
| 6 to (6 + y) | Supported/Negotiated Compression Algorithm IE | | | | | | | |
| m to (m+4) | These octet(s) is/are present only if explicitly specified | | | | | | | |

FIG. 2A

ENHANCED CP FUNCTION FEATURES IE OCTET/BIT DESCRIPTIONS

| Feature Octet / Bit | Feature | Interface | Description |
|---|---|---|---|
| 5/1 | LOAD | Sxa, Sxb, Sxc, N4 | Load Control is supported by the CP function. |
| 5/2 | OVRL | Sxa, Sxb, Sxc, N4 | Overload Control is supported by the CP function. |
| 5/3 | EPFAR | Sxa, Sxb, Sxc, N4 | The CP function supports the Enhanced PFCP Association Release feature (see clause 5.18). |
| 5/4 | SSET | N4 | SMF support of PFCP sessions successively controlled by different SMFs of a same SMF Set (see clause 5.22). |
| 5/5 | BUNDL | Sxa, Sxb, Sxc, N4 | PFCP messages bundling (see clause 6.5) is supported by the CP function. |
| 5/6 | MPAS | N4 | SMF support for multiple PFCP associations from an SMF set to a single UPF (see clause 5.22.3). |
| 5/7 | COMPRESS | Sxa, Sxb, Sxc, N4 | PFCP Message compression supported by CP Function |

Feature Octet / Bit: The octet and bit number within the Supported-Features IE, e.g. "5 / 1".
Feature: A short name that can be used to refer to the octet / bit and to the feature.
Interface: A list of applicable interfaces to the feature.
Description: A clear textual description of the feature.

SUPPORTED/NEGOTIATED COMPRESSION ALGORITHM IE
210

| Octets | Bits 8 | 7 | 6 | 5 | 4 | 3 | 2 | 1 |
|---|---|---|---|---|---|---|---|---|
| 1 to 2 | Type = X (decimal) ―212 | | | | | | | |
| 3 to 4 | Length = n ―214 | | | | | | | |
| 5 | Spare | | | | Number of supported compression values (y) ―216b | | | |
| 6 to (6 + y) | List of y supported compression values in priority order | | | | | | | |
| m to (m+4) | These octet(s) is/are present only if explicitly specified ―218 | | | | | | | |

SUPPORTED/NEGOTIATED COMPRESSION ALGORITHM VALUES

| Compression Algorithm | Values (Decimal) |
|---|---|
| ZIP | 0 |
| GZIP | 1 |
| BZIP2 | 2 |

FIG.2D

ENHANCED UP FUNCTION FEATURES IE
220

| Octets | Bits 8 7 6 5 4 3 2 1 |
|---|---|
| 1 to 2 | Type = 43 (decimal) — 222 |
| 3 to 4 | Length = n — 224 |
| 5 to 6 | Supported-Features — 226 |
| 7 to 8 | Additional Supported-Features 1 — 228 |
| 9 + y | Supported/Negotiated Compression Algorithm IE — 210 |
| m to (m+4) | These octet(s) is/are present only if explicitly specified |

FIG. 2E

ENHANCED UP FUNCTION FEATURES IE OCTET/BIT DESCRIPTIONS

FIG. 2F

| Feature Octet / Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation / release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function. |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace. |
| 6/6 | FRRT | Sxb, N4 | The UP function supports Framed Routing. |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature. |
| 7/1 | OPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs. |
| 7/3 | UEIP | N4 | The UPF supports allocating UE IP addresses or prefixes. |
| 7/4 | SSET | N4 | UPF support of PFCP sessions successively controlled by different SMFs of a same SMF Set. |
| 7/5 | MNOP | Sxa, Sxb, Sxc, N4 | UPF supports measurement of number of packets which is instructed with the flag 'Measurement of Number of Packets in a URR. |
| 7/6 | MTE | N4 | UPF supports multiple instances of Traffic Endpoint IDs in a PDI. |
| 7/7 | BUNDL | Sxa, Sxb, Sxc, N4 | PFCP messages bundling is supported by the UP function. |
| 7/8 | GCOM | N4 | UPF support of 5G VN Group Communication. |
| 8/1 | MPAS | N4 | UPF support for multiple PFCP associations to the SMFs in an SMF set. |
| 8/2 | RTTL | N4 | The UP function supports redundant transmission at transport layer. |
| 8/3 | VTIME | Sxb, N4 | UPF support of quota validity time feature. |
| 8/4 | COMPRESS | Sxa, Sxb, Sxc, N4 | PFCP Message compression supported by UP Function |

Feature Octet / Bit: The octet and bit number within the Supported-Features IE, e.g. "5 / 1". Feature: A short name that can be used to refer to the octet / bit and to the feature. Interface: A list of applicable interfaces to the feature. Description: A clear textual description of the feature.

229

TECHNIQUES TO DYNAMICALLY NEGOTIATE AND PROVIDE COMPRESSION FOR PACKET FORWARDING CONTROL PROTOCOL (PFCP) MESSAGES

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in managing messaging between control plane functions and user plane functions in virtualized architectures.

BRIEF DESCRIPTION OF THE DRAWINGS

FIGS. 2A, 2B, 2C, 2D, 2E, and 2F illustrate example details for various information elements (IEs) that may be utilized to facilitate dynamic negotiation and compression for PFCP messages, according to various example embodiments.

DESCRIPTION OF EXAMPLE EMBODIMENTS

Overview

Figure 1:
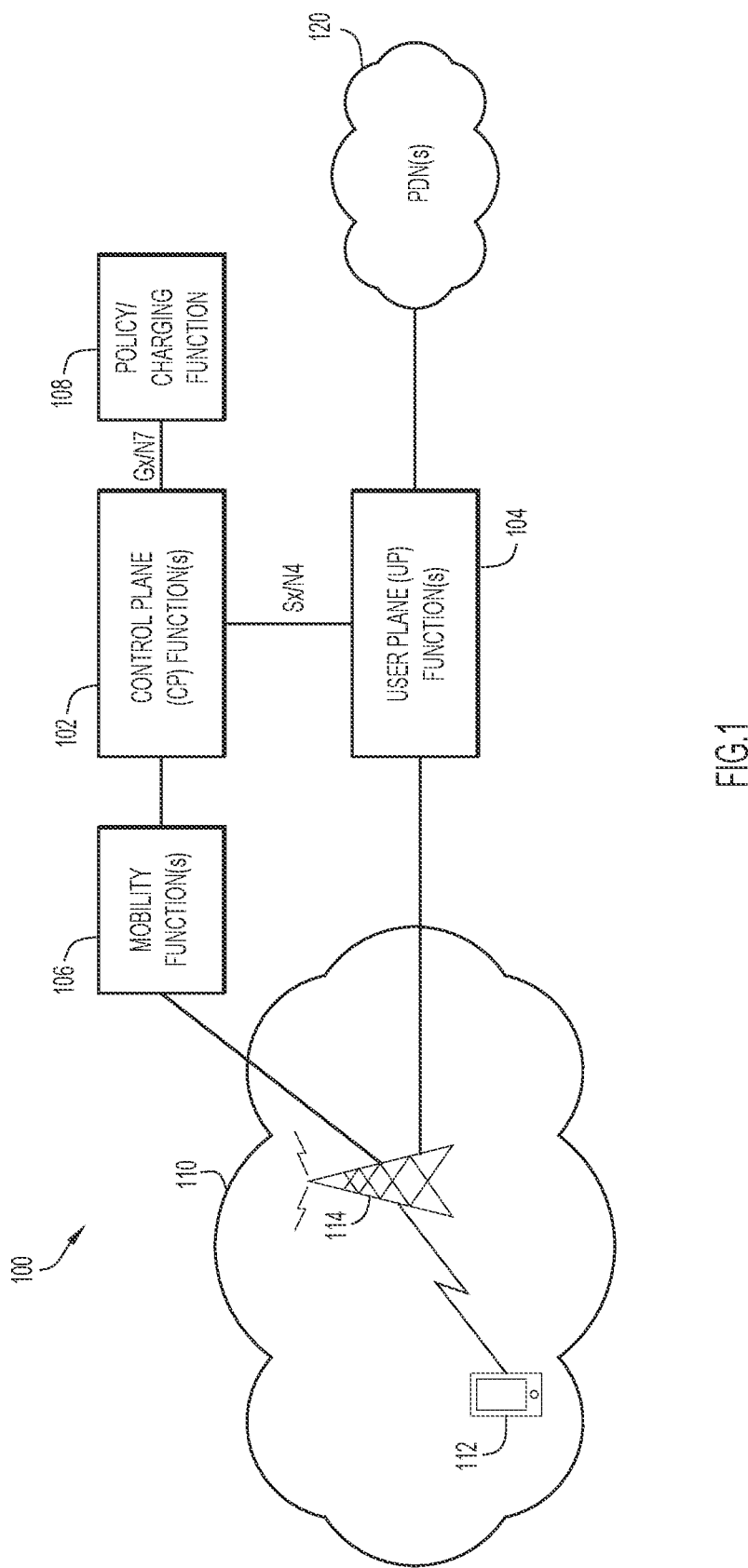
FIG. 1 is a diagram of a system in which techniques that facilitate dynamic negotiation and compression for Packet Forwarding Control Protocol (PFCP) messages may be implemented, according to an example embodiment.

Compression of Sx/N4 messages coupled with security can improve the reliability of the Third (3rd) Generation Partnership Project (3GPP)-defined Sx/N4 interface between control plane (CP) and user plane (UP) function (also referred to herein interchangeably as 'instances', 'entities', 'elements', and/or variations thereof) for virtualized mobile network architectures. Compression of Sx/N4 messages may also help to scale deployments involving a large number of UP functions per a given CP function, which may be utilized for complex deployments and also remote Control and User Plane Separation (CUPS) deployments in which UP instances may be hosted in a remote-edge data center location while CP instances may be hosted at a central data center location. For such remote CUPS deployments, signaling communications between remote CUPS instances using Sx/N4 interfaces may involve a limited bandwidth Wide Area Network (WAN) link that is to be optimally utilized.

Techniques presented herein may provide for the ability to achieve signaling benefits between UP and CP instances through negotiation of one or more compression algorithm(s) between UP and CP instances for Packet Control Forwarding Protocol (PFCP) messages and then compressing PFCP messages exchanged via Sx/N4 interfaces between the UP and CP instances utilizing the negotiated compression algorithm(s). Techniques presented herein may provide various signaling benefits for a service provider. For example, as a higher number of policy and/or charging rules may be installed for user traffic, filters can be installed on bearers by the control plane in a single PFCP message, which may significantly reduce PFCP control message size and, hence, PFCP signaling traffic communicated between the control plane and the user plane. In another example, deduced PFCP traffic between CP and UP functions may help to increase of the reliability and/or faster communication of messages exchanged over Sx/N4 interfaces.

In an example embodiment, a method is provided that may include identifying, by a function, a negotiated compression algorithm to utilize for compressing one or more Packet Forwarding Control Protocol (PFCP) messages; determining whether a payload for a particular PFCP message is to be compressed based on at least one of system resources of the function and a size of the payload; based on determining that the payload is to be compressed, compressing the payload utilizing the negotiated compression algorithm to generate a compressed PFCP message; and setting a compression indication in a header of the compressed PFCP message.

EXAMPLE EMBODIMENTS

Architectures that facilitate network communications generally rely upon three basic components: a data or user plane, a control plane, and a management plane. Typically, the user plane carries data traffic, while the control plane and the management plane serve the user plane. As referred to herein and in the claims, the term 'plane' can refer to a separation of traffic that can traverse a network.

Computing device(s) having hardware resources, software resources, etc. that can be abstracted into one or more logical layers can be used to facilitate building and deploying Software Defined Network (SDN) architectures for virtualized network environments. Generally, SDN architectures provide an approach to building and deploying computer networks, networking equipment, and software that separates and abstracts the control plane (CP) and user plane (UP) of networking systems.

Referring to FIG. 1, FIG. 1 is a block diagram of a system 100 in which techniques that facilitate dynamic negotiation and compression for Packet Forwarding Control Protocol (PFCP) messages may be implemented, according to an example embodiment.

In at least one embodiment, system 100 may include a Radio Access Network (RAN) 110, one or more control plane (CP) function(s) 102, one or more user plane (UP) function(s) 104, one or more mobility function(s) 106, and a policy and charging function 108 (referred to herein as 'policy/charging function 108'). In at least one embodiment, RAN 110 may include a RAN node 114 that enables over-the-air RF communications with at least one user equipment (UE) 112. Also shown in FIG. 1 are one or more Packet Data Network(s) (PDN(s)) 120.

RAN node 114 may interface with user plane function(s) 104 and mobility function(s) 106. Mobility function(s) 106 may further interface with control plane function(s) 102. User plane function(s) 104 may further interface with one or more PDN(s) 120. User plane function(s) 104 may also interface with control plane function(s) 102 via any combination of a 3GPP Sx interface and/or N4 interface, depending on application and/or implementation, as discussed below.

Per 3GPP specifications for a 3GPP Fourth (4th) Generation (4G)/Long Term Evolution (LTE) mobile core network (often referred to as the Evolved Packet Core or System (EPC/EPS)), the 3GPP-defined Sx interfaces such as Sxa, Sxb, and Sxc interfaces are utilized to facilitate interfacing between user plane (UP) function(s) 104 and control plane (CP) function(s) 102 in which UP function(s) 104 may include any combination of user plane PDN Gateway (PGW-U) functions, user plane Serving Gateway (SGW-U) functions, user plane System Architecture Evolution (SAEGW-U) functions, and/or user plane Traffic Detection Function (TDF-U) functions and CP function(s) 102 may include control plane PGW (PGW-C) functions, control plane SGW (SGW-C) functions, control plane SAEGW (SAEGW-C) functions, and/or control plane TDF (TDF-C) functions. For example, as defined in 3GPP standards for 4G CUPS architectures, the interface interconnecting an SGW-C and an SGW-U is an Sxa interface, the interface interconnecting a PGW-C and a PGW-U is an Sxb interface, the interface interconnecting a TDF-C and a TDF-U is an Sxc interface, and the interface interconnecting an SAEGW-C and an SAEGW-U is a combined Sxa/Sxb interface. As referred to herein, any combination of Sxa, Sxb, and/or Sxc interfaces may be referred to generally as the Sx interface or Sx interfaces.

Per 3GPP specifications for a 3GPP Fifth (5th) Generation (5G) core network (5GC or 5GCN) or next Generation (nG) core network, the 3GPP-defined N4 interface is utilized to facilitate interfacing between UP function(s) 104 and CP function(s) 102 in which UP function(s) 104 may include User Plane Function (UPF) functions and CP function(s) 102 may include Session Management Function (SMF) functions.

Techniques presented herein may be applied to any combination of 4G and/or 5G/nG deployments. As such, the interface interconnecting UP and CP functions discussed for various embodiments described herein may be referred to as the Sx/N4 interface or Sx/N4 interfaces (e.g., for interconnecting each of multiple UP instances per CP instance).

In various embodiments, control plane function(s) 102 may be any combination and/or number of control plane functions/elements/nodes/instances/etc. that may be provided (e.g., hosted/instantiated via one or more compute nodes) for a 3GPP 4G CUPS/5G/nG architecture that may provision, control, monitor, manage, etc. a user plane function and/or UE sessions such that control plane function(s) 102 may be implemented as any combination and/or number of a PGW-C, a TDF-C, a SAEGW-C, a SMF, and/or the like as may be now defined or hereafter defined according to 3GPP standards. In various embodiments, user plane function(s) 104 may be implemented as any combination and/or number of user plane functions/elements/nodes/instances/ etc. that may be provided (e.g., hosted/instantiated vie one or more compute nodes) for a 3GPP 4G CUPS/5G/nG architecture that facilitates interface(s) to one or more PDN(s), such as, but not limited to, any combination and/or number of a PGW-U, TDF-U, a SAEGW-U, a UPF, and/or the like may be now defined or hereafter defined according to 3GPP standards. In various embodiments, mobility function(s) 106 may be any combination and/or number of an MME and/or an AMF that may be provided for a 3GPP 4G CUPS/5G/nG architecture that may perform functions of MMEs/AMFs may be now defined or hereafter defined according to 3GPP standards.

Policy/charging function 108 may be any combination and/or number of a Policy and Charging Rules Function (PCRF), as defined by 3GPP standards for 4G CUPS architectures, Policy Control Function (PCF), as defined by 3GPP standards for 5G architectures and/or any other policy/ charging function as may be hereafter defined according to 3GPP standards. Policy/charging element 108 may be provided (e.g., hosted/instantiated via one or more compute nodes) to facilitate any combination of PCRF/PCF functionality to support operations as described herein.

In various embodiments, control plane function(s) 102, user plane function(s) 104, mobility function(s) 106, and policy/charging function 108 may be implemented/hosted via one or more compute node(s) having hardware and software resources, which can be abstracted into one or more instances (instantiations) of control plane function(s) 102, user plane function(s) 104, mobility function(s) 106, and/or policy/charging function(s) 108. In various embodiments, a compute function can include, but not be limited to a data center compute function, which may be implemented as a server, rack of servers, multiple racks of servers, etc. for a data center, distributed across multiple data centers, and/or the like.

In various embodiments, UE 112 may be associated with any user, subscriber, employee, client, customer, electronic device, etc. wishing to initiate a flow in system 100 via some network. The terms 'UE device', 'UE', 'subscriber', and 'user' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, a smart phone, an Internet Protocol (IP) phone, wearable electronic device or any other device, component, element, or object capable of initiating voice, audio, video, media, or data exchanges within system 100. UE 112 discussed herein may also be inclusive of a suitable interface to a human user such as a microphone, a display, a keyboard, or other terminal equipment. UE 112 may also be any device that seeks to initiate a communication on behalf of another entity or element such as a program, a database, or any other component, device, element, or object capable of initiating an exchange within system 100. In some embodiments, UE 112 may have a bundled subscription for network access and application services, etc. In various embodiments, RAN node 114 may be configured as an evolved Node B (eNodeB or eNB) (e.g., for a 4G RAN), a next generation Node B (gNodeB or gNB) (e.g., for a 5G RAN), or any combination thereof.

In 4G CUPS and/or 5G/nG architectures, a CP function, such as a given CP function 102, can push services, policy and charging rules, Access Point Name (APN)/Data Network (DN) information, IP pool chunks and many other service parameters to UP function(s) 104 the PFCP protocol based Sx/N4 interface. Policy and charging rules may be obtained by the CP function 102 via policy/charging element 108.

As the number of policy and charging rules to be installed per UE bearer increases, various rules and/or combinations thereof are to be installed, such as Packet Detection Rules (PDRs), Forwarding Action Rules (FARs), Usage Reporting Rules (URRs), Quality of Service (QoS) Enhancement Rules (QERs), and/or Buffering Action Rules (BARs). These rules/messages are signaled via PFCP Sx/N4 session establishment and modification procedures, as defined according to 3GPP standards. Inclusion of these many rules can significantly increase PFCP message size as well as the number of messages that may be sent for for a complete transaction between control plane and user plane entities.

For remote 4G CUPS and/or 5G/nG deployments, control plane and user plane functions can be hosted at geographically distinct locations and a significant increase in Sx/N4 traffic could cause potential problems in reliable communication of signaling messages over a WAN. Sometimes congestion can cause messages to be dropped, which can cause inconsistencies in communications. Further, for 4G CUPS or 5G/nG deployments involving a large number of user plane instances per a given control plane instance, the signaling traffic on the Sx/N4 interface can increase significantly.

Presented herein is a technique to determine Sx/N4 message queues at either end (at the control plane end and/or user plane end) of a control plane/user plane interface and dynamically compress payload(s) of one or more PFCP message(s) communicated to an opposing end, which can be decompressed at the opposing end. As discussed in further detail herein, compression algorithm(s) can be decided or negotiated mutually between functions based on defined parameters and/or options.

During operation in accordance with techniques presented herein, function feature negotiation can be performed between control plane function(s) 102 and user plane function(s) 104 in which a compression feature along with one or more compression algorithm(s) can be negotiated between the user plane and control plane for PFCP messages. In some instances, a prioritized list of compression algorithms can be negotiated between user plane and control plane functions. Either the user plane functions or the control plane functions may initiate the negotiations at any time during operation.

Upon negotiating/determining one or more compression algorithm(s), the functions may perform various checks to determine whether compression/de-compression is to be utilized for messages transmitted/received via the Sx/N4 interface.

Section 7.4.4 of 3GPP Technical Specification (TS 29.244) defines conventional PFCP Association messages that may be utilized in conventional PFCP Association procedures. PFCP message compression techniques presented herein can be used by both control plane function(s) 102 and user plane function(s) 104 in which a corresponding function can indicate support of the compression feature during the PFCP Association Setup or PFCP Update procedure.

The CP Function Features Information Element (IE), as defined by 3GPP TS 29.244, Section 8.2.58 is typically used by a CP function to indicate features supported the CP function. The CP Function Features IE takes the form of a bitmask in which each bit set indicates that a corresponding feature is supported.

According to embodiments herein, the standards-based CP Function Features IE can be enhanced or otherwise extended to carry an indication to indicate whether compression is supported by a given CP function, such as CP function 102. The standards-based CP Function Features IE can also be enhanced to carry a new Supported/Negotiated Compression Algorithm IE, which can be used indicate one or more compression algorithm(s) that can be utilized by the CP function 102 to compress/decompress PFCP messages or, more specifically, the payload of PFCP messages.

Referring to FIGS. 2A, 2B, 2C, and 2D, FIGS. 2A, 2B, 2C, and 2D illustrate example details associated with an enhanced CP Function Features IE 200 that may be utilized by a given CP function to indicate whether the CP function supports compression as well as to indicate one or more compression algorithm(s) supported by the CP function. As illustrated in FIG. 2A, the enhanced CP Function Features IE 200 may include a Type field 202 (carried in octets 1 to 2), a Length field 204 (carried in octets 3 to 4), a Supported-Features field 206 (carried in octet 5), and a Supported/Negotiated Compression Algorithm IE 210 (which may be carried in octets 6 to 6+y for a 'y' number of compression algorithms that may be carried in IE 210, in some embodiments). Additional octets m to (m+4) can be set to carry additional information/fields in some embodiments. In at least one embodiment, the Type field 202 can be set to a decimal value of 89 and the Length field 204 can be set to a value depending on the number of algorithms identified in the Supported/Negotiated Compression Algorithm IE 210, as discussed in FIG. 2C. It is to be understood that the octet(s)/byte(s) used to carry the Supported/Negotiated Compression Algorithm IE can be varied to be any other octet(s)/byte(s) and is not limited to octets 6 to 6+y. For example, if octets 6 to 6+y are set by standards carry to some other value(s)/information, then another spare octet(s)/byte(s) may be utilized to carry the compression indication in accordance with embodiments presented herein.

As illustrated in FIG. 2B, in at least one embodiment, Feature octet 5, bit 7 (5/7) of the enhanced CP Function Features IE 200 can be configured to indicate support for the compression feature 208 (COMPRESS) for the Sxa, Sxb, Sxc, and N4 interfaces in which bit 7 can be set to '1' by a given CP function 102 to indicate that the CP function supports compression. It is to be understood that the bit used to indicate the compression feature can be varied to be any other Feature octet/bit and is not limited to Feature octet 5, bit 7. For example, if Feature octet 5, bit 7 is set by standards to carry some other value/information, then another spare Feature octet/bit may be utilized to carry the compression indication in accordance with embodiments presented herein.

As shown in FIG. 2C, the new supported/negotiated compression algorithm IE 210 may include a Type field 212 (carried in octets 1 to 2), a Length field (carried in octets 3 to 4), a spare bits field 216a (carried in octet 5, bits 8 to 5), a supported compression values field 216b (carried in octet 5, bits 4 to 1), and List field(s) 218 (carried in octets 6 to (6+y)). Additional octets m to (m+4) can be set to carry additional information/fields in some embodiments.

In at least one embodiment, Type field 212 can be set to any unique decimal value that can be utilized to identify the supported/negotiated compression algorithm IE 210 and the Length field 214 can be set to a value based on the number of compression algorithms carried in octets 6 to (6+y) and any additional information that may be carried in octets 'm' to (m+4). The supported compression values field 216*b* can be set to a value 'y' that indicates the corresponding number of compression algorithms that may be identified in octets 6 to (6+y) of the List field(s) 218. List field(s) 218 in octets 6 to (6+y) can identify, in a prioritized order, the compression algorithm(s) supported by the CP function.

Various example supported/negotiated compression algorithm values are illustrated in FIG. 2D for various compression algorithms that may be supported by a given function, including ZIP that may be identified by a decimal value of '0', GZIP that may be identified by a decimal value of '1', and BZIP2 that may be identified by a decimal value of '2'. Generally, ZIP, GZIP, and BZIP2 are examples of compression formats that may be utilized to provide lossless data compression/decompression. The ZIP file format may utilize the DEFLATE compression algorithm, among others. The DEFLATE compression algorithm is a combination of the LZ77 compression algorithm ad Huffman coding. The GZIP file format is based on the DEFLATE compression algorithm. BZIP2 compression is based on the Burrows-Wheeler algorithm.

These example compression formats/algorithms are only examples algorithms that may be supported by functions discussed herein. It is to be understood that virtually any number and/or type of compression algorithms may be utilized an accordance with embodiments herein and, thus, are clearly within the scope of embodiments herein. Further, it is to be understood that any values may be assigned to any number of compression algorithms in order to be identified by corresponding functions of a network.

Consider an example in which a prioritized order of compression algorithms is set to GZIP having a highest priority, BZIP2 having a next highest priority, and ZIP having a lowest priority. In this example, octet 5 bits 4 to 1 could be set to identify a decimal value of 3 (binary '0011') to indicate three compression formats/algorithms supported by the CP, octet 6 could be set to a decimal value of '1' (binary '0000 0001'), octet 7 could be set to a decimal value of 2 (binary '0000 0010'), and octet 8 could be set to a decimal value of 0 (binary '0000 0000'). This prioritized list could be negotiated with a corresponding UP function, as discussed in further detail herein, in order to identify one or more negotiated compression algorithms that could be utilized to compress PFCP message(s) exchanged between the CP and UP functions.

Turning to UP function(s) 104, the UP Function Features Information Element (IE), as defined by 3GPP TS 29.244, Section 8.2.25 is typically used by a UP function to indicate features supported the UP function. The UP Function Features IE also takes the form of a bitmask in which each bit set indicates that a corresponding feature is supported.

According to embodiments herein, the standards-based UP Function Features IE can be enhanced or otherwise extended to carry an indication to indicate whether compression is supported by a given UP function, such as UP function 104. The standards-based UP Function Features IE can also be enhanced to carry the new Supported/Negotiated Compression Algorithm IE 210 that can also be used by the UP function 104 to indicate one or more compression algorithm(s) that can be utilized by the UP function 104 to compress/decompress PFCP messages or, more specifically, the payload of PFCP messages.

Referring to FIGS. 2E and 2F, FIGS. 2E and 2F illustrate example details associated with an enhanced UP Function Features IE 220 that may be utilized by a given UP function to indicate whether the UP function supports compression as well as to indicate one or more compression algorithm(s) supported by the UP function. As illustrated in FIG. 2E, the enhanced UP Function Features IE 220 may include a Type field 222 (carried in octets 1 to 2), a Length field 224 (carried in octets 3 to 4), Supported-Features fields 226 (carried in octets 5 to 6), additional Supported-Features1 fields 228 (carried in octets 7 to 8) and the Supported/Negotiated Compression Algorithm IE 210 (carried in octets 9+y for a 'y' number of compression algorithms that may be carried in IE 210). Additional octets m to (m+4) can be set to carry additional information/fields in some embodiments. In at least one embodiment, the Type field 222 can be set to a decimal value of 43 and the Length field 224 can be set to a value depending on the number of algorithms identified in the Supported/Negotiated Compression Algorithm IE 210 as set by the UP function. It is to be understood that the octet(s)/byte(s) used to carry the Supported/Negotiated Compression Algorithm IE can be varied to be any other octet(s)/byte(s) and is not limited to octets 9+y. For example, if octets 9+y are set by standards carry to some other value(s)/information, then another spare octet(s)/byte(s) may be utilized to carry the compression indication in accordance with embodiments presented herein.

As illustrated in FIG. 2F, Feature octet 8, bit 4 (8/4) of the enhanced UP Function Features IE 220 can be configured to indicate support for the compression feature 229 (COMPRESS) for the Sxa, Sxb, Sxc, and N4 interfaces in which bit 4 can be set '1' by a given UP function 104 to indicate that the UP function supports compression. It is to be understood that the bit used to indicate the compression feature can be varied to be any other Feature octet/bit and is not limited to Feature octet 8, bit 4. For example, if Feature octet 8, bit 4 is set by standards to carry some other value/information, then another spare Feature octet/bit may be utilized to carry the compression indication in accordance with embodiments presented herein.

Various PFCP Association messages can be used to indicate PFCP message compression and supported/negotiated compression algorithm(s) during the PFCP Association procedure including PFCP Association Setup Request messages (as prescribed by 3GPP TS 29.244, Section 7.4.4.1), PFCP Association Setup Response messages (as prescribed by 3GPP TS 29.244, Section 7.4.4.2), PFCP Association Update Request messages (as prescribed by 3GPP TS 29.244, Section 7.4.4.3), and/or PFCP Association Update Response messages (as prescribed by 3GPP TS 29.244, Section 7.4.4.4).

Thus, CP functions 102 and UP functions 104 can negotiate via the Function Features IEs in order to that the CP and UP may support PFCP message compression as well as identifying one or more supported compression algorithm(s) for algorithm negotiations.

Following negotiation of one or more compression algorithm(s) between a CP function 102 and a UP function 104, PFCP compression/de-compression processes can be performed by a given CP/UP function to determine whether PFCP message payload(s) are to be compressed utilizing at least one negotiated compression algorithm for PFCP message(s) sent to an opposing end of the Sx/N4 interface. Thus, the CP and UP functions 102/104 may utilize negotiated compression algorithm(s) while communicating with a peer function/node.

For a PFCP message that is to be compressed by a given CP or UP function, the CP or UP function can set a compression flag in a PFCP header of a PFCP message and compress the encoded payload of the PFCP message utilizing a negotiated compression algorithm. A negotiated compression algorithm indication may also be set in the PFCP header indicating the negotiated compression algorithm utilized for compressing the payload.

The compressed PFCP message may then be transmitted over the Sx/N4 interface to an opposing CP or UP function. Upon receiving PFCP messages over the Sx/N4 interface a receiving CP or UP function can check the compression the compression flag in the PFCP header and, if set, can decompress the payload utilizing the negotiated compression algorithm also identified in the PFCP header. Once decompressed, the function can decode the PFCP message utilizing techniques as prescribed by 3GPP standards.

Figure 2G:
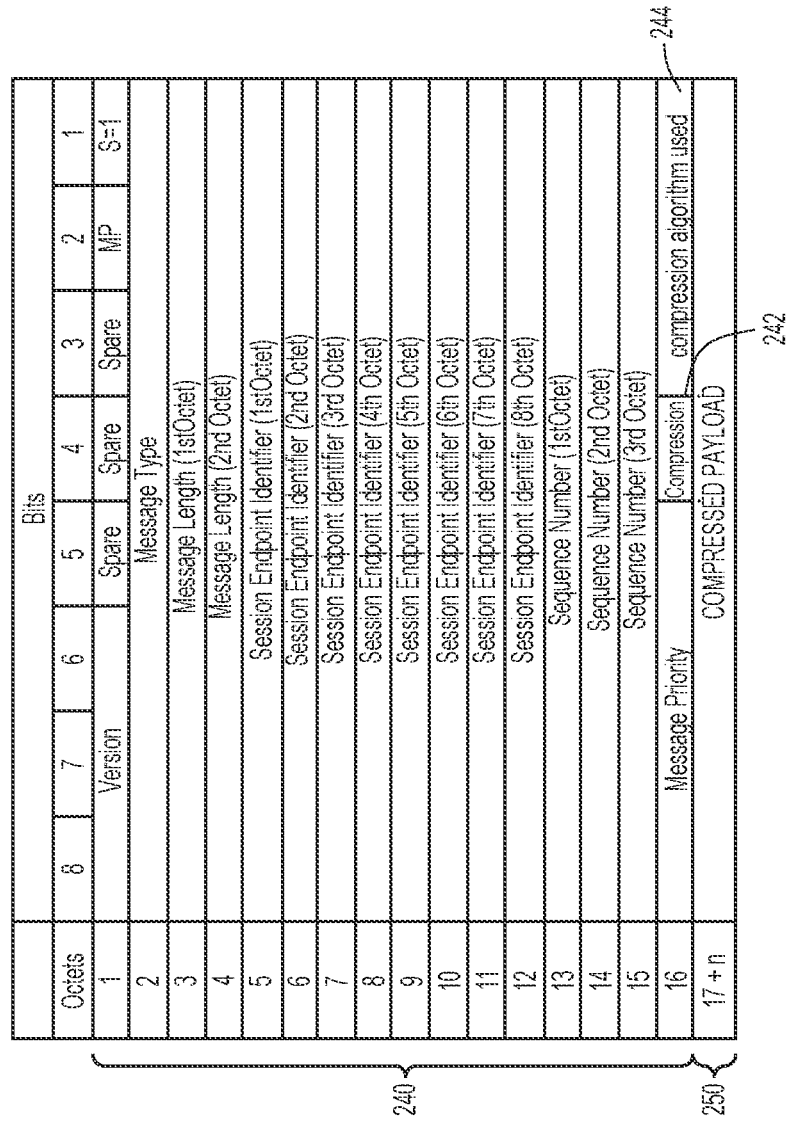
FIG. 2G illustrates example details for an example compressed PFCP message, according to an example embodiment.

Referring to FIG. 2G, FIG. 2G illustrates example details for an example compressed PFCP message 230, according to an example embodiment. In at least one embodiment, compressed PFCP message 230 may be a session related message including a PFCP header 240 with an indication of compression and the compression algorithm used in the header 240 and a compressed payload 250.

Octets 1 to 15 of the PFCP header 240 may be set according to the message 230 length and other information as prescribed according to 3GPP TS 29.244, Section 7.2.2.3. Octet 16 of the PFCP header 240 can be enhanced at bit 4 (16/4) to include a compression flag or indication 242 that can be set by a given CP or UP function to indicate that the payload 250 of the PFCP message 230 is compressed. Bits 3 to 1 of octet 16 can also be enhanced to include a compression algorithm indication 244 in which the bits may be set to the corresponding decimal value (e.g. 0, 1, 2, etc.) to identify the corresponding compression algorithm utilized by the CP or UP function to compress the payload 250 of the PFCP message 140. It is to be understood that the octet/bits used to carry the compression flag and the compression algorithm indication can be varied to be any other octet(s)/bits and is not limited to those illustrated in FIG. 2G. For example, if octet 16 bits 1-4 are set by standards to some other value(s)/information, then other spare octet(s)/bit(s) may be utilized to carry the compression flag and the compression algorithm indication in accordance with embodiments presented herein.

Below is an example format of a PFCP header in which the compression indication is enabled and the compression algorithm indication is set to GZIP, as follows:

PFCP HEADER
  Version number: 1
  SEID flag: Present
  MP flag: Not present
  Message Length: 0x02CB (715)
  Interface: SXb
  Compression: Enabled
  Compression Used: GZIP A compression determination may be made by a given CP or UP function prior to compressing and transmitting a given PFCP message. In at least one embodiment, a given CP or UP function may perform one or more check(s) to determine whether to compress a PFCP message payload. In one embodiment, a CP or UP function may perform a check of system resources (e.g., central processing unit (CPU) resources and/or any other system resources) of the CP or UP function. If the function determines that insufficient system resources are available to compress a given PFCP message payload, the payload is not compressed and the compression indication 242 and compression algorithm indication 244 are unset (e.g., maintained at zero values) in the PFCP header 240.

In some cases, it is possible that PFCP message payload length may be under a threshold value that may not benefit from compression. Accordingly, in some embodiments a CP or UP function can compare the payload length against a minimum payload threshold length (e.g., 50 octets or the like) to determine whether to compress a give PFCP message. If the payload length is less than or equal to the minimum payload threshold length, the CP or UP function can determine that the payload is not to be compressed and the compression indication 242 and the compression algorithm indication 244 can be left unset in the PFCP header 240 for the PFCP message transmitted to the opposing end.

In still some cases, it is possible that after compression PFCP payload length may be big enough to lead to segmented PFCP messages. Such segmentation may be difficult for the receiving end to understand in order re-assemble PFCP messages before decompressing. Accordingly, in some embodiments, a CP or UP function can perform a comparison between compressed payload length and a maximum compressed payload threshold length to determine whether a given PFCP message is to be transmitted in a compressed or uncompressed form. For example, as per standards, a maximum User Datagram Protocol (UDP) length is 65,507 bytes for IP version 4 (IPv4) and 65,527 bytes for IP version 6 (IPv6). Thus, the maximum compressed payload threshold length can be set based on communications using IPv4 or IPv6. If the compressed payload length is greater than or equal to the maximum compressed payload threshold length, the CP or UP function can determine that the payload is not to be compressed and the compression indication 242 and the compression algorithm indication 244 can be left unset in the PFCP header 240 for the PFCP message transmitted to the opposing end.

Accordingly, techniques herein provide for the ability to compress and decompress PFCP messages communicated via the Sx/N4 interface between CP functions 102 and UP functions 104 in a mobile network.

Figure 3:
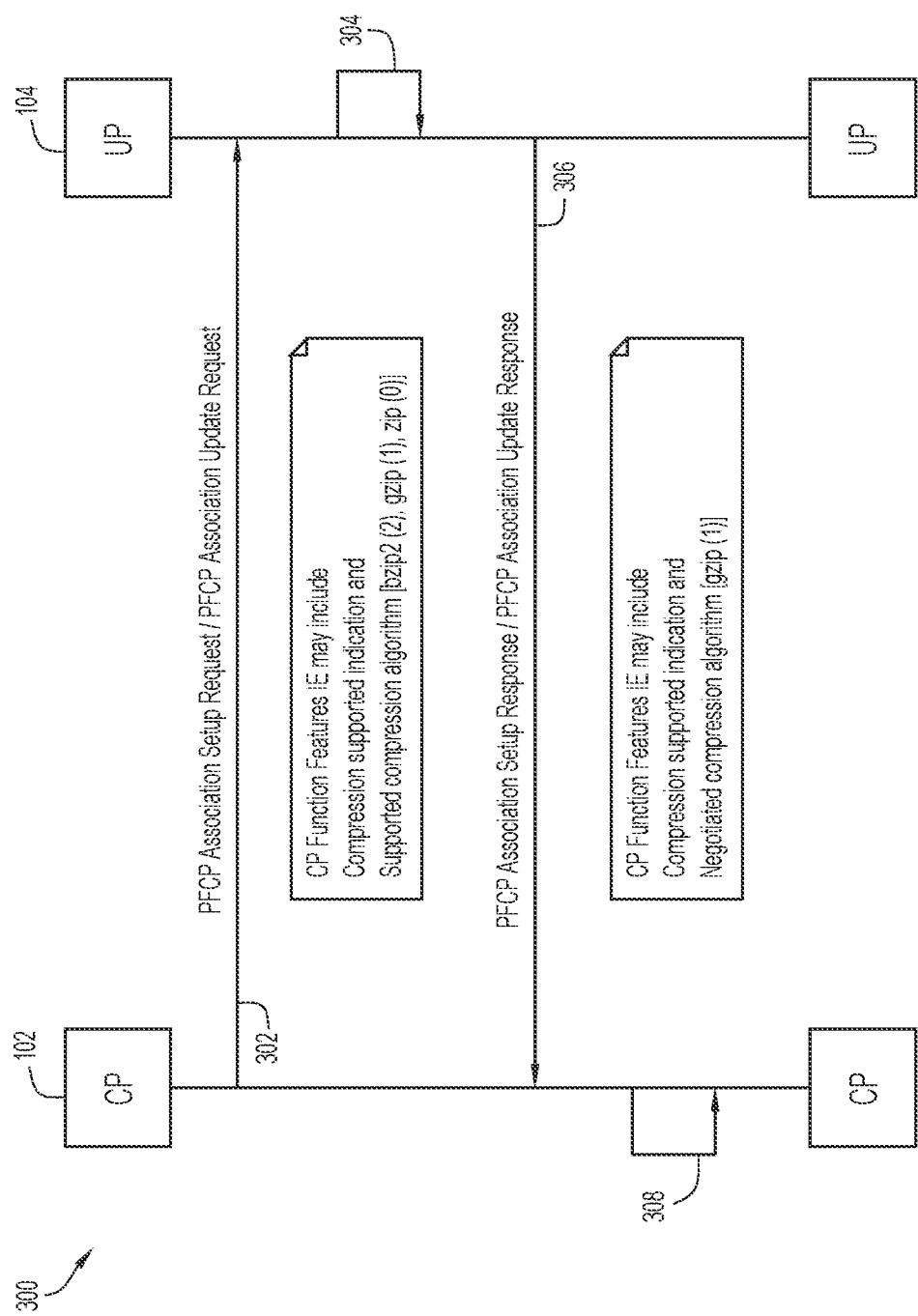
FIG. 3 is a message sequence diagram illustrating a call flow associated with dynamic compression algorithm negotiation for PFCP messages between a control plane (CP) function and a user plane (UP) function as initiated by the CP function, according to an example embodiment.

FIG. 3 is a message sequence diagram illustrating a call flow 300 associated with dynamic compression algorithm negotiations for PFCP messages between CP function 102 and UP function 104 as may be initiated by the CP function 102, according to an example embodiment. Reference may be made to FIGS. 2A-2F in the discussion of FIG. 3.

At 302, CP function 102 may transmit a PFCP Association Setup Request message or a PFCP Association Update Request message to UP function 104 including the enhanced CP Function Features IE 200 in which the compression supported indication at octet 5/bit 7 (or some other octet/bit, depending on implementation) is set to a value of '1' and the supported/negotiated compression IE 210 is set to include a prioritized list of algorithms including BZIP2 having a highest priority, GZIP having a next highest priority, and ZIP having a lowest priority.

At 304, UP function 104 receives the message, parses octet 5/bit 7 to identify that CP function 102 supports compression, and determines the prioritized list of compression algorithms supported by CP function 102 via the supported/negotiated compression IE 210 contained in the message. UP function 104 may also identify at 304 one or more compression algorithm(s) supported by the UP function 104 for PFCP message compression/decompression.

Consider for the present example that UP function 104 identifies GZIP as a compression algorithm supported by the UP function 104.

Thus, at 306, UP function 104 transmits a PFCP Association Setup Response message or a PFCP Association Update Response message to CP function 102 including the enhanced UP Function Features IE 220 in which the compression supported indication at octet 8/bit 4 (or some other octet/bit, depending on implementation) is set to a value of '1' and the supported/negotiated compression IE 210 is set to include a prioritized list of algorithms including GZIP. Upon receiving the corresponding message, CP function 102 may identify, at 308, GZIP as the compression algorithm in this example to utilize for compressing PFCP messages to be sent to UP function 104.

Figure 4:
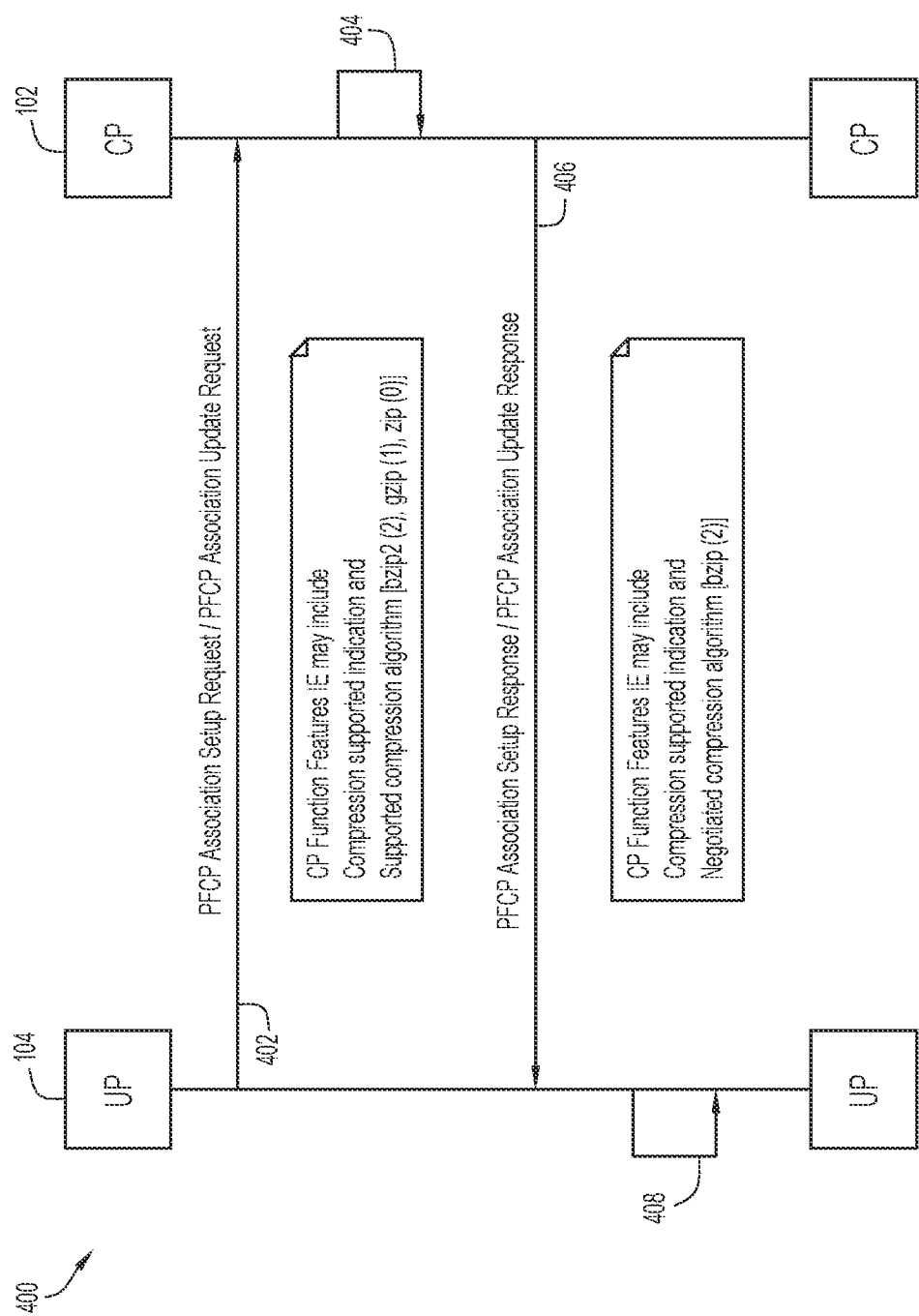
FIG. 4 is a message sequence diagram illustrating a call flow associated with dynamic compression algorithm negotiation for PFCP messages between a user plane (UP) function and a control plane (CP) function as initiated by the UP function, according to an example embodiment.

FIG. 4 is a message sequence diagram illustrating a call flow 400 associated with dynamic compression algorithm negotiations for PFCP messages between UP function 104 and CP function 102 as may be initiated by the UP function 104, according to an example embodiment. Reference may be made to FIGS. 2A-2F in the discussion of FIG. 4.

At 402, UP function 104 may transmit a PFCP Association Setup Request message or a PFCP Association Update Request message to CP function 102 including the enhanced UP Function Features IE 220 in which the compression supported indication at octet 8/bit 4 (or some other octet/bit, depending on implementation) is set to a value of '1' and the supported/negotiated compression IE 210 is set to include a prioritized list of algorithms including BZIP2 having a highest priority, GZIP having a next highest priority, and ZIP having a lowest priority.

At 404, CP function 102 receives the message, parses octet 8/bit 4 to identify that UP function 104 supports compression, and determines the prioritized list of compression algorithms supported by UP function 104 via the supported/negotiated compression IE 210 contained in the message. CP function 102 may also identify at 404 one or more compression algorithm(s) supported by the CP function 102 for PFCP message compression/decompression. Consider for the present example, that CP function 102 identifies BZIP2 as a compression algorithm supported by the CP function 102.

At 406, CP function 102 transmits a PFCP Association Setup Response message or a PFCP Association Update Response message to UP function 104 including the enhanced CP Function Features IE 200 in which the compression supported indication at octet 5/bit 7 (or some other octet/bit, depending on implementation) is set to a value of '1' and the supported/negotiated compression IE 210 is set to include a prioritized list of algorithm including BZIP2. Upon receiving the corresponding message, UP function 104 may identify, at 408, BZIP2 as the compression algorithm in this example to utilize for compressing PFCP messages to be sent to CP function 102.

Thus, as illustrated in FIGS. 3 and 4, a first function may identify a first prioritized list of compression algorithms supported by the first function and a second function may identify, based at least in part on the first prioritized list, a second prioritized list of compression algorithms supported by the second function in which an order of the list of compression algorithms identified in the second prioritized list may be different than an order of the list of compression algorithms identified in the first prioritized list.

Figure 5:
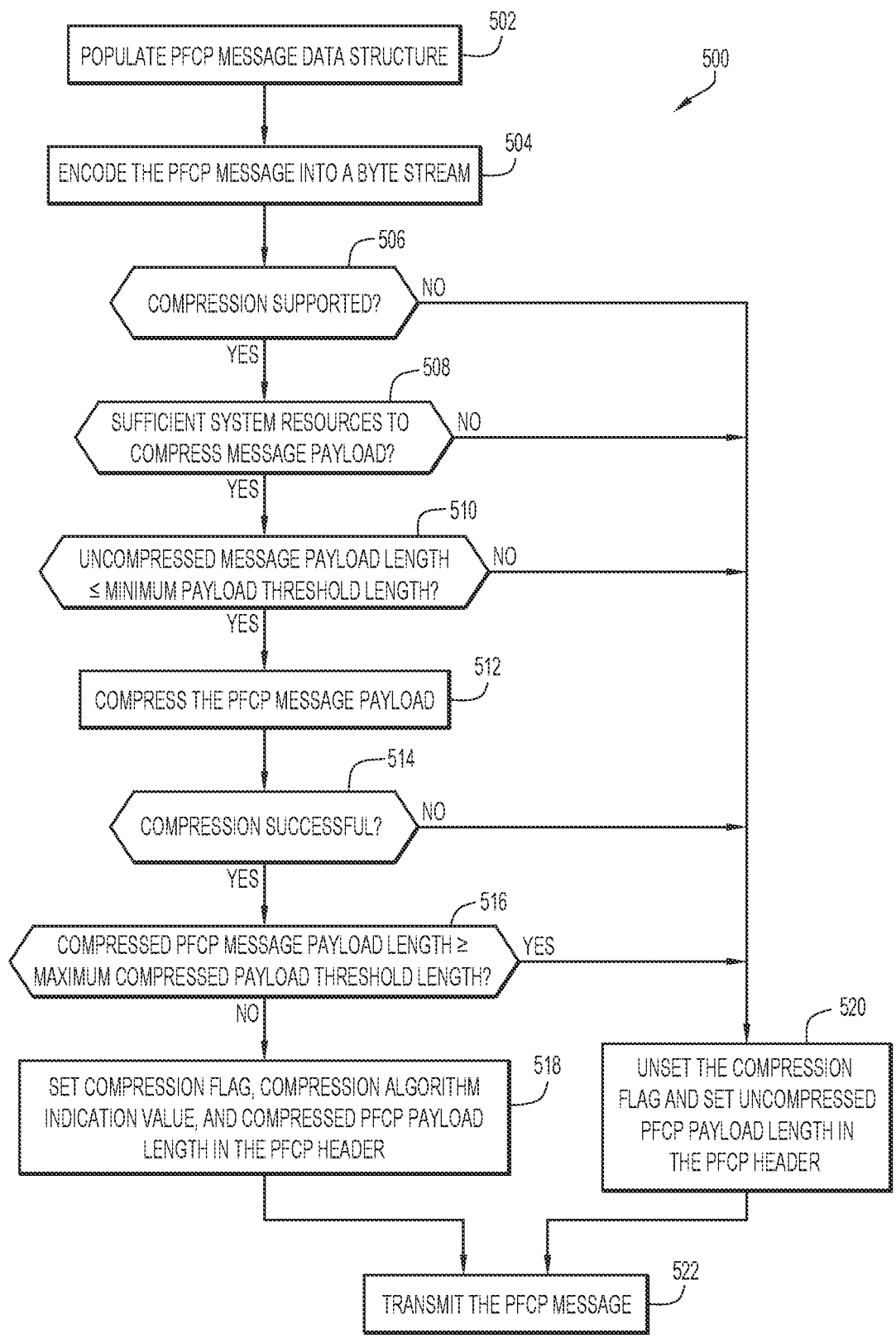
FIG. 5 is a flow chart depicting a method associated with PFCP message compression, according to an example embodiment.

Referring to FIG. 5, FIG. 5 is a flow chart depicting a method 500 associated with PFCP message compression, according to an example embodiment. In particular, method 500 illustrates example operations that may be performed by a CP function 102 or a UP function 104, as discussed for various techniques presented herein.

At 502, the method may include the CP/UP function populating a PFCP message data structure. In at least one embodiment, an application layer or logic of the CP/UP function may populate the PFCP message data structure as prescribed at least by 3GPP TS 29.244. At 504, the method may include the CP/UP function encoding the PFCP message into a byte stream. In at least one embodiment, an Sx or N4 layer or logic of the CP/UP function may encode the PFCP message into the byte stream as prescribed at least by 3GPP TS 29.244.

At 506, the method may include the CP/UP function determining whether compression is supported by the function. Based on a determination at 506 that compression is not supported by the function, the method may include the function, at 520, unsetting (or leaving unset) the compression flag in the PFCP header of the message and setting the PFCP payload length in the PFCP header and transmitting the (uncompressed) PFCP message at 522 to the peer function/node.

However, based on a determination at 506 that compression is supported by the function, the method may include the function determining, at 508, whether sufficient system resources are available to compress the message payload. In at least one embodiment, the determination at 508 may be performed based on determining that a threshold level of processing resources, memory resources, etc. are available to perform the compression. Based on a determination at 508 that there are not sufficient system resources, the method may continue to 520 and 522, as discussed above, to transmit the uncompressed PFCP message to the peer function/node.

However, based on a determination at 508 that there are sufficient system resources to compress the message, the method may include, at 510, the CP/UP function determining whether the uncompressed message payload length is less than or equal to a minimum payload threshold length. Based on a determination at 510 that the uncompressed message payload length is less than or equal to the minimum payload threshold length, the method may continue to 520 and 522, as discussed above, to transmit the uncompressed PFCP message to the peer function/node.

However, based on a determination at 510 that the uncompressed message payload length is not less than or equal to (i.e., is greater than) the minimum payload threshold length, the method may include the CP/UP function compressing the PFCP message payload at 512 utilizing a negotiated compression algorithm (e.g., as negotiated utilizing a process as discussed for FIG. 3 or FIG. 4).

Following the compression, the CP/UP function determines at 514 whether the compression at 514 was successful. For example, the selected compression algorithm can indicate whether compression is successful or not in return values. Based on a determination at 514 that the compression was not successful, the method may continue to 520 and 522, as discussed above, to transmit the uncompressed PFCP message to the peer function/node.

However, based on a determination at 514 that the compression was successful, the method may include the CP/UP function determining, at 516, whether the compressed PFCP message payload length is greater than or equal to a maximum compressed payload threshold length (e.g., to identify that segmentation across multiple messages may be needed for sending the compressed PFCP message payload). Based on a determination at 516, that the compressed PFCP message payload length is greater than or equal to the maximum compressed payload threshold length, the method may continue to 520 and 522, as discussed above, to transmit the uncompressed PFCP message to the peer function/node.

However, based on a determination at 516 that the compressed PFCP message payload length is not greater than or equal to (i.e., is less than) the maximum compressed payload threshold length, the method may include the CP/UP function, at 518, setting the compression flag, the compression algorithm indication value, and the compressed PFCP payload length in the PFCP header of the message and transmitting the (compressed) PFCP message to the peer function/node at 522. Thus, method 500 illustrates various operations that may be performed by a CP/UP function in order to compress and transmit one or more PFCP message(s).

Figure 6:
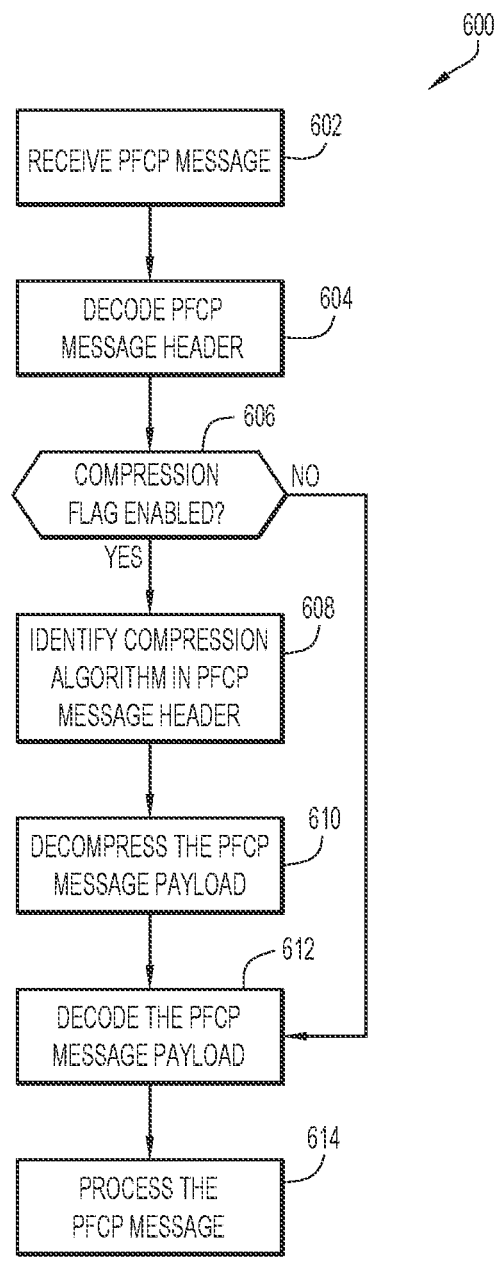
FIG. 6 is a flow chart depicting a method associated with PFCP message decompression, according to an example embodiment.

Referring to FIG. 6, FIG. 6 is a flow chart depicting a method 600 associated with PFCP message decompression, according to an example embodiment. In particular, method 600 illustrates example operations that may be performed by a CP function 102 or a UP function 104, as discussed for various techniques presented herein.

At 602, the method may include the CP/UP function receiving a PFCP message from a peer function/node. In at least one embodiment, an Sx or N4 layer or logic of the CP/UP function may receive and identify the PFCP message. At 604, the method may include the CP/UP function decoding the PFCP message header. In at least one embodiment, the Sx or N4 layer or logic of the CP/UP function may also be utilized to decode the PFCP message header.

At 606, the method may include the CP/UP function determining whether the compression flag in the PFCP header is enabled/set. Based on a determination at 606 that the compression flag in the PFCP header is not enabled/not set, the method may include the CP/UP node decoding the PFCP message payload at 612 and further processing the PFCP message at 614. In at least one embodiment, an application layer or logic of the CP/UP node may process the PFCP message based on processes prescribed at least by 3GPP TS 29.244.

However, based on a determination at 606 that the compression flag in the PFCP header is enabled/set, the method may include the CP/UP function identifying, at 608, a negotiated compression algorithm identified in the PFCP header that was utilized to compress the PFCP message payload. At 610, the method may include the CP/UP function decompressing the PFCP message payload utilizing the negotiated compression algorithm identified in the PFCP header. Upon decompressing the PFCP message payload at 610, the method may include decoding the PFCP message payload at 612 and further processing the PFCP message at 614, as discussed above. Thus, method 600 illustrates various operations that may be performed by a CP/UP function in order to decompress one or more PFCP message(s).

Figure 7:
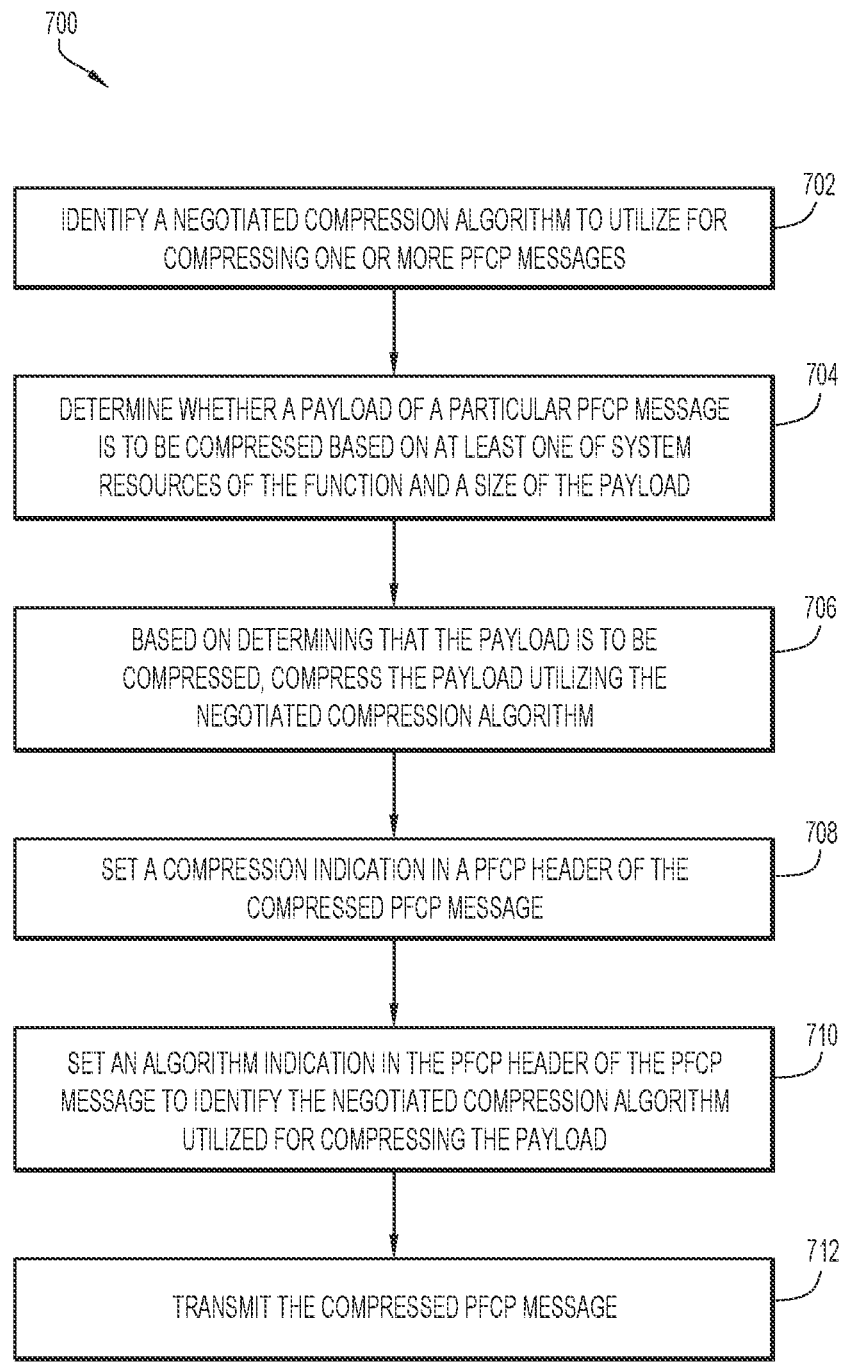
FIG. 7 is another flow chart depicting another method, according to an example embodiment.

Referring to FIG. 7, FIG. 7 is another flow chart depicting another method 700 according to an example embodiment. In particular, method 700 illustrates example operations that may be performed by a CP function 102 or a UP function 104, as discussed for various techniques presented herein.

At 702, the method may include identifying, by a function (e.g., a CP or a UP function), a negotiated compression algorithm to utilize for compressing one or more PFCP messages. At 704, the method may include the function determining whether a payload for a particular PFCP message is to be compressed based on at least one of system resources of the function (e.g., processing resources, memory resources, etc.) and a size of the payload (e.g., uncompressed length being above the minimum payload threshold length).

Based on determining at 704 that the payload is to be compressed, the method may include compressing the payload AT 706 utilizing the negotiated compression algorithm to generate a compressed PFCP message. At 708, the method may include setting a compression indication in a PFCP header of the compressed PFCP message. At 710, the method may include setting an algorithm indication in the PFCP header of the PFCP message to identify the negotiated compression algorithm utilized for compressing the payload of the PFCP message. At 712, the method may include transmitting the compressed PFCP message to a peer function. In some embodiments, prior to 708, the method can include determining whether the compressed payload length is less than or equal to a maximum compressed payload threshold length in which the payload will not be compressed if the compressed payload is greater than or equal to the maximum threshold length.

Figure 8:
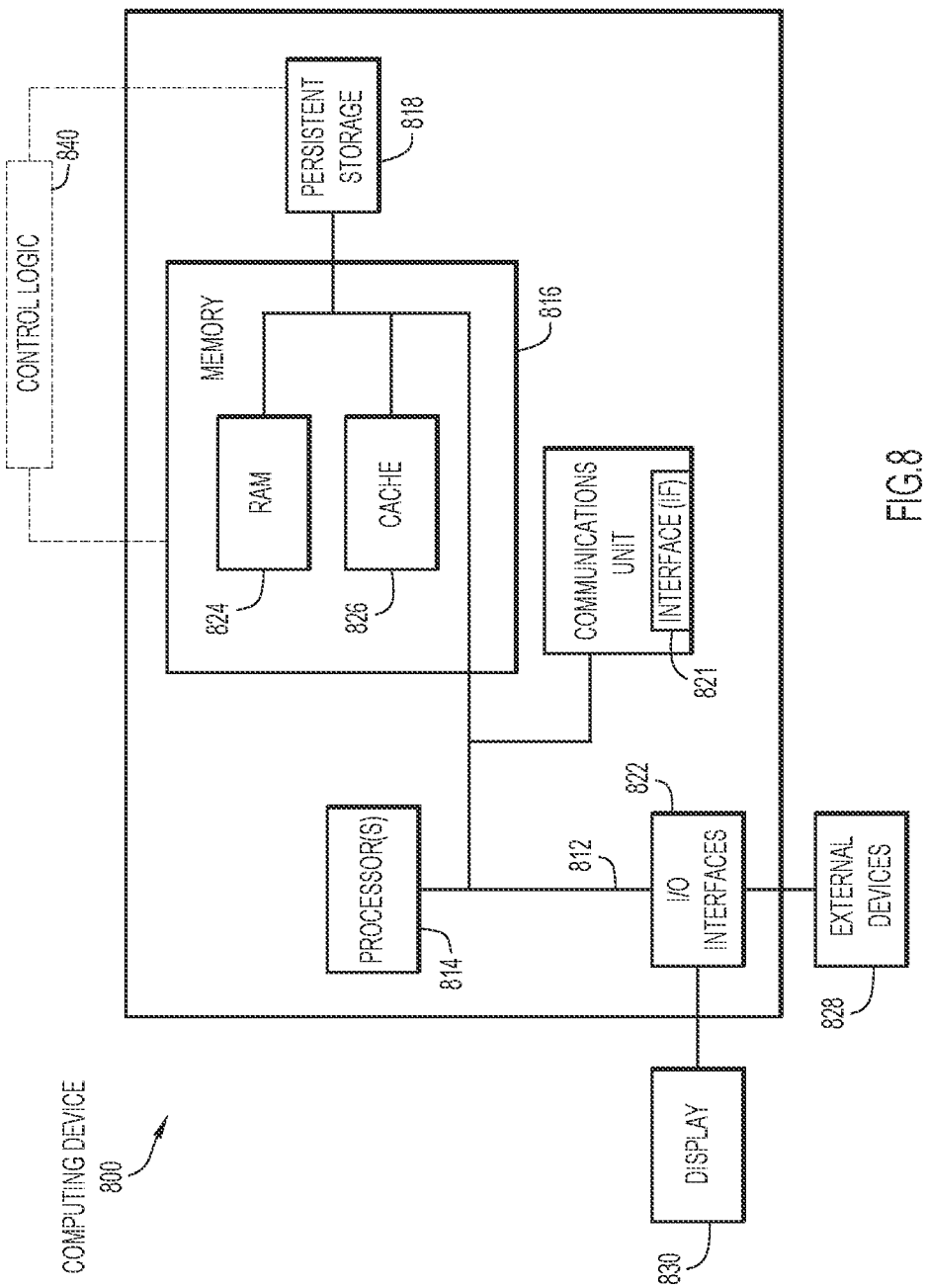
FIG. 8 is a hardware block diagram of a computing device that may perform functions associated with any combination of operations, in connection with the techniques depicted in FIGS. 1-7.

Referring to FIG. 8, FIG. 8 illustrates a hardware block diagram of a computing device 800 that may perform functions associated with facilitating dynamic negotiation and compression operations for PFCP messages as discussed herein in connection with the techniques depicted in FIGS. 1-7. In various embodiments, a computing device, such as computing device 800 or any combination of computing devices 800, may be configured as any of a CP function 102 or a UP function 104 as discussed for the techniques depicted in connection with FIGS. 1-7.

It should be appreciated that FIG. 8 provides only an illustration of one embodiment and does not imply any limitations with regard to the environments in which different embodiments may be implemented. Many modifications to the depicted environment may be made.

As depicted, the computing device 800 includes a bus 812, which provides communications between computer processor(s) 814, memory 816, persistent storage 818, at least one communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media, which can be inclusive on non-transitory computer readable storage media. In the depicted embodiment, memory 816, which may be inclusive of one or more memory element(s), includes random access memory (RAM) 824 and cache memory 826. In general, memory 816 can include any suitable volatile or non-volatile computer readable storage media. Instructions for control logic 840 may be stored in memory 816 and/or persistent storage 818 for execution by processor(s) 814.

When the processor(s) 814 execute control logic 840, the processor(s) 814 are caused to perform the operations described above in connection with FIGS. 1-7. For example, if computing device 800 is implemented as a CP function or a UP function that may compress one or more PFCP message(s), executing the control logic 840 may cause the processor(s) 814 to perform operations associated with any of negotiating one or more compression algorithms with a peer function, determining whether to compress the payload for one or more PFCP message(s), setting corresponding indications, etc. in PFCP header(s) of compressed PFCP message(s), transmitting compressed PFCP message(s), and/or or the like discussed for various embodiments described herein.

In another example, if computing device 800 is implemented as a CP function or a UP function that may decompress one or more PFCP message(s), executing the control logic 840 may cause the processor(s) 814 to perform operations associated with identifying compressed PFCP message(s), decompressing the payload of compressed PFCP message(s), and/or the like discussed for various embodiments described herein.

One or more programs and/or other logic may be stored in persistent storage 818 for execution by one or more of the respective computer processors 814 via one or more memory element(s) of memory 816. The persistent storage 818 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems, networks, and/or devices. In these examples, each communications unit 820 may include at least one interface (IF) 821, which may facilitate communications with systems, networks, and/or devices utilizing any combination of hardware, software, etc. to facilitate one or more connections for communications discussed herein. Accordingly, communications unit 820 may provide communications through the use of any combination of physical and/or wireless communications links.

I/O interface(s) 822, which may be inclusive of one or more network interface cards (NICs), allows for input and output of data with other devices that may be connected to computing device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

Any of UE 112, mobility function(s) 106, and/or policy/charging function 108 may be computing devices having similar configurations/features as those discussed for the embodiment of FIG. 8.

In one form, a computer-implemented method is provided that may include identifying, by a function, a negotiated compression algorithm to utilize for compressing one or more Packet Forwarding Control Protocol (PFCP) messages; determining whether a payload for a particular PFCP message is to be compressed based on at least one of system resources of the function and a size of the payload; based on determining that the payload is to be compressed, compressing the payload utilizing the negotiated compression algorithm to generate a compressed PFCP message; and setting a compression indication in a header of the compressed PFCP message.

In one instance, the function may be a first function in which the method may further include communicating the compressed PFCP message to a second function. In one instance prior to the communicating, the method may further include setting an indication in the header of the PFCP message identifying the negotiated compression algorithm utilized for compressing the payload of the compressed PFCP message.

In various implementations, one of the first function may be a control plane function and the second function may be a user plane function or the first function may be a user plane function and the second function may be a control plane function. In various implementations, the communicating may be performed utilizing one of a Third (3rd) Generation Partnership Project (3GPP) Sx interface or a 3GPP N4 interface.

In some instances, the function may be a first function in which the method may further include: prior to the identifying, negotiating one or more compression algorithms between the first function and a second function using PFCP association setup messaging exchanges between the first function and the second function or using PFCP update messaging exchanges between the first function and the second function. In some instances, the negotiating may include identifying, by the first function to the second function, a plurality of compression algorithms supported by the first function; and identifying, by the second function, one or more compression algorithms supported by the second function based on the plurality of compression algorithms identified by the first function. In some instances, the plurality of compression algorithms supported by the first function can be identified using a first prioritized list of the plurality of compression algorithms supported by the first function. In some instances, the one or more compression algorithms supported by the second function can be identified using a second prioritized list of the one or more compression algorithms support by the second function. In some instances, an order of the first prioritized list may be different from an order of the second prioritized list.

In some instances, determining whether the payload for the particular PFCP message is to be compressed based the size of the payload may include determining whether a length of the payload is above a minimum length threshold in which the compressing is performed based on the length of the payload being above the minimum length threshold.

In still some instances, the method may further include determining, following the compressing, whether a compressed length of the payload is less than or equal to a maximum compressed payload length; and based on determining that the compressed length is greater than the maximum compressed payload length, uncompressing the message.

In summary, presented herein are techniques that provide for the introduction of a new feature in the PFCP protocol stack to advertise compression algorithm(s) supported by both CP and UP functions/nodes during Sx/N4 association or update procedures. Negotiation of compression algorithms out of a list of supported algorithms can be exchanged between CP and UP functions/nodes. Additionally, any industry standard compression algorithms can be inserted into an enumerated list of algorithms that can be used during compression algorithm negotiation between CP and UP functions.

Further, techniques herein may facilitate graceful handling of cases or situations in which compression may not be enabled for some PFCP messages. Such graceful handling of PFCP messages may help to ensure no signaling loss due to the potential inability of a sending PFCP entity to compress the payload (e.g., if the sending entity is experiencing a system resource crunch to compress the data, when the payload is less or equal to a minimum threshold, and/or when the compressed data exceeds a maximum allowable size within a PFCP packet). If no compression algorithm(s) are negotiated from the supported list by CP or UP, then the PFCP signaling can still be performed intact without any compression (e.g., the compression flag will be unset in such cases).

Various advantages may be realized utilizing techniques described herein. For example, in one embodiment, the techniques may enable the control plane to install more rules and filters on UE bearers. In another embodiment, the techniques may enable less signaling traffic between control plane and user plane entities. In yet another embodiment, such reduced signaling may increase signaling reliability and facilitate faster communications between control plane and user plane entities.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    negotiating, by a first function, one or more compression algorithms with a second function to identify a negotiated compression algorithm to utilize for compressing one or more Packet Forwarding Control Protocol (PFCP) messages, wherein the negotiating is performed using PFCP association setup messaging exchanges with the second function or using PFCP association update messaging exchanges with the second function;
    determining whether a payload for a particular PFCP message is to be compressed based on at least one of system resources of the first function and a size of the payload;
    based on determining that the payload is to be compressed, compressing the payload utilizing the negotiated compression algorithm to generate a compressed PFCP message; and
    setting a compression indication in a header of the compressed PFCP message.

2. The method of claim 1, further comprising communicating the compressed PFCP message to the second function.

3. The method of claim 2, further comprising:
    prior to the communicating, setting an indication in the header of the PFCP message identifying the negotiated compression algorithm utilized for compressing the payload of the compressed PFCP message.

4. The method of claim 2, wherein one of:
    the first function is a control plane function and the second function is a user plane function; and
    the first function is a user plane function and the second function is a control plane function.

5. The method of claim 2, wherein the communicating is performed utilizing one of a Third Generation Partnership Project (3GPP) Sx interface or a 3GPP N4 interface.

6. The method of claim 1, wherein negotiating comprises:
    identifying, by the first function to the second function, a plurality of compression algorithms supported by the first function; and
    identifying, by the second function, one or more compression algorithms supported by the second function based on the plurality of compression algorithms identified by the first function.

7. The method of claim 6, wherein the plurality of compression algorithms supported by the first function are identified using a first prioritized list of the plurality of compression algorithms supported by the first function.

8. The method of claim 7, wherein the one or more compression algorithms supported by the second function are identified using a second prioritized list of the one or more compression algorithms supported by the second function.

9. The method of claim 8, wherein an order of the first prioritized list is different from an order of the second prioritized list.

10. The method of claim 1, wherein determining whether the payload for the particular PFCP message is to be compressed based the size of the payload includes determining whether a length of the payload is above a minimum length threshold, wherein the compressing is performed based on the length of the payload being above the minimum length threshold.

11. The method of claim 1, further comprising:
  determining, following the compressing, whether a compressed length of the payload is less than or equal to a maximum compressed payload length; and
  based on determining that the compressed length is greater than the maximum compressed payload length, uncompressing the compressed PFCP message.

12. One or more non-transitory computer readable storage media encoded with instructions that, when executed by a processor, cause the processor to perform operations, comprising:
  negotiating, by a first function, one or more compression algorithms with a second function to identify a negotiated compression algorithm to utilize for compressing one or more Packet Forwarding Control Protocol (PFCP) messages, wherein the negotiating is performed using PFCP association setup messaging exchanges with the second function or using PFCP association update messaging exchanges with the second function;
  determining whether a payload for a particular PFCP message is to be compressed based on at least one of system resources of the first function and a size of the payload;
  based on determining that the payload is to be compressed, compressing the payload utilizing the negotiated compression algorithm to generate a compressed PFCP message; and
  setting a compression indication in a header of the compressed PFCP message.

13. The media of claim 12, wherein the instructions, when executed by the processor, cause the processor to perform further operations comprising communicating the compressed PFCP message to the second function.

14. The media of claim 13, wherein the instructions, when executed by the processor, cause the processor to perform further operations
  prior to the communicating, setting an indication in the header of the PFCP message identifying the negotiated compression algorithm utilized for compressing the payload of the compressed PFCP message.

15. The media of claim 12, wherein determining whether the payload for the particular PFCP message is to be compressed based the size of the payload includes determining whether a length of the payload is above a minimum length threshold, wherein the compressing is performed based on the length of the payload being above the minimum length threshold.

16. A first function comprising:
  at least one memory element for storing data; and
  at least one processor for executing instructions associated with the data, wherein executing the instructions causes the first function to perform operations, comprising:
    negotiating, by the first function, one or more compression algorithms with a second function to identify a negotiated compression algorithm to utilize for compressing one or more Packet Forwarding Control Protocol (PFCP) messages, wherein the negotiating is performed using PFCP association setup messaging exchanges with the second function or using PFCP association update messaging exchanges with the second function;
    determining whether a payload for a particular PFCP message is to be compressed based on at least one of system resources of the first function and a size of the payload;
    based on determining that the payload is to be compressed, compressing the payload utilizing the negotiated compression algorithm to generate a compressed PFCP message; and
    setting a compression indication in a header of the compressed PFCP message.

17. The first function of claim 16, wherein executing the instructions causes the first function to perform further operations comprising:
  setting an indication in the header of the PFCP message identifying the negotiated compression algorithm utilized for compressing the payload of the compressed PFCP message; and
  communicating the compressed PFCP message to the second function.

18. The first function of claim 17, wherein the communicating is performed utilizing one of a Third Generation Partnership Project (3GPP) Sx interface or a 3GPP N4 interface.

19. The first function of claim 16, wherein determining whether the payload for the particular PFCP message is to be compressed based the size of the payload includes determining whether a length of the payload is above a minimum length threshold, wherein the compressing is performed based on the length of the payload being above the minimum length threshold.

20. The first function of claim 16, wherein executing the instructions causes the first function to perform further operations comprising:
  determining, following the compressing, whether a compressed length of the payload is less than or equal to a maximum compressed payload length; and
  based on determining that the compressed length is greater than the maximum compressed payload length, uncompressing the compressed PFCP message.

* * * * *